US006571197B1

(12) United States Patent
Frank et al.

(10) Patent No.: US 6,571,197 B1
(45) Date of Patent: May 27, 2003

(54) SYSTEM AND METHOD FOR IDENTIFYING A VEHICLE BASED ON A LOAD TO BE TRANSPORTED

(75) Inventors: Daniel Richard Frank, Denver, PA (US); Bryan Donald Gayman, Reading, PA (US); Thomas Joseph Janowicz, Downington, PA (US); Christopher Martin Johannessen, Dublin, PA (US); Sean M. Kennedy, Reading, PA (US)

(73) Assignee: Penske Truck Leasing Co., L.P., Reading, PA (US)

( * ) Notice: Subject to any disclaimer, the term of this patent is extended or adjusted under 35 U.S.C. 154(b) by 0 days.

(21) Appl. No.: 09/837,126

(22) Filed: Apr. 18, 2001

(51) Int. Cl.[7] .............................................. G01G 19/00
(52) U.S. Cl. ........................ 702/175; 702/173; 702/174
(58) Field of Search ................................. 702/101–102, 702/128, 173–175; 700/214–217, 305; 177/25.13, 25.14, 134–136

(56) References Cited

U.S. PATENT DOCUMENTS

| | | | | |
|---|---|---|---|---|
| 3,842,922 A | * | 10/1974 | Fagin et al. | 177/1 |
| 5,167,289 A | * | 12/1992 | Stevenson | 177/25.13 |
| 5,710,716 A | * | 1/1998 | Hurst et al. | 702/155 |
| 5,794,416 A |  | 8/1998 | Rahman |  |
| 5,803,502 A | * | 9/1998 | Noll et al. | 177/136 |
| 5,884,238 A |  | 3/1999 | Noll et al. |  |

OTHER PUBLICATIONS

Budget Rent a car Corporation, Household movers boxes & supplies, 1999, A Global System of Corporate and licensse–owned locations, 6 pages.*
User Interface Screen Prints from World Wide Web Site at www.moving.com. Sep. 2000 2 pages.
User Interface Screen Prints from World Wide Web Site at www.homefair.com. 1999–2000 2 pages.
User Interface Screen Prints from World Wide Web Site at www.upack.com. Dec. 1999 2 pages.
User Interface Screen Prints from World Wide Web Site at www.yellowtruck.com. Nov. 1999 10 pages.
User Interface Screen Prints from World Wide Web Site at www.hertztrucks.com. Nov. 1999 2 pages.
Printouts of user interface screens accessed via Internet at url: http://www.budget.com/cars/moving/moving_lighten.html, dated Oct. 8, 2001 (1 pg).
Printouts of user interface screens accessed via Internet at url: http://www.uhaul.com/guide/, dated Aug. 3, 2001 (22 pp).
Printouts of user interface screens accessed via Internet at url: http://www.budget.com/trucks/consumer/supplies/index.html, dated Aug. 3, 2001 (6 pp) 1999.

* cited by examiner

*Primary Examiner*—Bryan Bui
(74) *Attorney, Agent, or Firm*—Brown & Raysman Millstein Felder & Steiner LLP

(57) ABSTRACT

Data processing systems and methods for recommending vehicles for transporting defined sets of items such as furniture or other property. A user interface allows a user to define characteristics of a transport load. Characteristics include, for example, volume, weight, and quantity of items to be loaded. Defined load characteristics are used in conjunction with additional factors such as, for example, local vehicle availability and/or predicted user packing efficiency, by the data processing system to determine a recommended vehicle or vehicle capacity, and to designate a preferred vehicle from an available inventory. Optionally items may be designated as constituting part of a vehicle load through user selection of system-defined or user-defined graphical representations of the items through using a computer interface controller, and "dragging and dropping" into a load designation field on a graphical interface.

31 Claims, 15 Drawing Sheets

FIG. 2A — 100

| ITEM ID | ITEM | LENGTH | WIDTH | HEIGHT | WEIGHT | ... |
|---|---|---|---|---|---|---|
| 001 | COUCH | 72 INCHES | 36 INCHES | 40 INCHES | 125.0 POUNDS | ... |
| 002 | COFFEE TABLE | 36 INCHES | 24 INCHES | 24 INCHES | 8.0 POUNDS | ... |
| 003 | PERSONAL COMPUTER | 24 INCHES | 24 INCHES | 28 INCHES | 25.0 POUNDS | ... |
| ... | ... | ... | ... | ... | ... | ... |
| 551 | MICROWAVE OVEN | 24 INCHES | 12 INCHES | 16 INCHES | 7.5 POUNDS | ... |

FIG. 2B — 120

| USER ID | ITEM ID | QUANTITY |
|---|---|---|
| dfranks@penske.com | 001 | 2 |
| dfranks@penske.com | 002 | 1 |
| dfranks@penske.com | 003 | 2 |
| dfranks@penske.com | 551 | 1 |
| ... | ... | ... |

FIG. 2C — 130

| TRUCK ID | TRUCK DESCRIPTION | LOAD CAPACITY | | |
|---|---|---|---|---|
| | | BY ROOMS | BY CUBIC VOLUME | BY TOTAL WEIGHT |
| T001 | 10 FOOT ECONOMY VAN | 1 TO 2 ROOMS | 400 CU. FT. | 3,500 LBS. |
| T002 | 15 FOOT STUDIO VAN | 2 TO 3 ROOMS | 725 CU. FT. | 3,000 LBS. |
| T003 | 20 FOOT FAMILY VAN | 4 TO 5 ROOMS | 1,150 CU. FT. | 7,000 LBS. |
| T004 | 25 FOOT MAXIE VAN | 6 TO 8 ROOMS | 1,400 CU. FT. | 6,000 LBS. |
| ... | ... | ... | ... | ... |

FIG. 4B

| Item | Quantity | | Item | Quantity |
|---|---|---|---|---|
| Medium Box | ☐ | | Kitchen | |
| Kitchen Table, Sm. | ☐ | | Stool | ☐ |
| Kitchen Table, Lg. | ☐ | | High Chair | ☐ |
| Kitchen Table Chair | ☐ | | Utility Cabinet | ☐ |
| Kitchen Cabinet | ☐ | | Rug, Large Roll | ☐ |
| Serving Cart | ☐ | | Rug, Small Roll | ☐ |
| Waste Basket | ☐ | | Medium Box | ☐ |
| Small Box | ☐ | | Large Box | ☐ |

420 → 412

Dining Room

| Item | Quantity | | Item | Quantity |
|---|---|---|---|---|
| Buffet | ☐ | | Dining Chair | ☐ |
| Corner Cabinet | ☐ | | Server | ☐ |
| Dining Table | ☐ | | Hutch | ☐ |

430

Office Den

| Item | Quantity | | Item | Quantity |
|---|---|---|---|---|
| Desk Lamp | ☐ | | Bookcase, Small | ☐ |
| Desk, Office | ☐ | | Personal Computer | ☐ |
| Filing Cabinet, Cardboard | ☐ | | Monitor | ☐ |
| Filing Cabinet, 2 Door | ☐ | | Printer | ☐ |
| Filing Cabinet, 4 Door | ☐ | | Wastepaper Basket | ☐ |
| Bookcase, Tall | ☐ | | | |

440

Bedrooms

| Item | Quantity | | Item | Quantity |
|---|---|---|---|---|
| Bed, Single | ☐ | | Chair, Rocker | ☐ |

FIG. 4C

| Item | Bedrooms Quantity | Item | Quantity |
|---|---|---|---|
| Bed, Single | ☐ | Chair, Rocker | ☐ |
| Bed, Double | ☐ | Chest, Cedar | ☐ |
| Bed, Queen | ☐ | Dresser, Vanity | ☐ |
| Bed, King | ☐ | Dresser, Single | ☐ |
| Bed, Bunk | ☐ | Dresser, Double | ☐ 404 |
| Chair, Straight | ☐ | Dresser, Triple | ☐ |
| Chair, Arm | ☐ | Night Table | ☐ |
| Small Box | ☐ | Large Box | ☐ |
| Medium Box | ☐ | | |

412

| Item | Porch / Outdoor Quantity | Item | Quantity |
|---|---|---|---|
| Bar-B-Q Grill, Sm. | ☐ | Picnic Table & Benches | ☐ |
| Bar-B-Q Grill, Lg. | ☐ | Bicycle | ☐ |
| Chair, Folding Table | ☐ | Snow Blower | ☐ |
| Chair, Non Folding | ☐ | Wheelbarrow | ☐ |
| Garden Hose & Tools | ☐ | Leaf Blower | ☐ |
| Step Ladder, Sm. | ☐ | Table Saw | ☐ |
| Step Ladder, Lg. | ☐ | Glider | ☐ |
| Lawn Mower, Power | ☐ | Outdoor Swings | ☐ |
| Lawn Mower, Riding | ☐ | Umbrella | ☐ |

| Item | Appliances Quantity | Item | Quantity |
|---|---|---|---|
| Air Conditioner, Window Sm. | ☐ | Refrigerator, Med. | ☐ |
| Air Conditioner, Window Lg. | ☐ | Refrigerator, Lg. | ☐ |
| Dehumidifier | ☐ | Trash Compactor | ☐ |
| Freezer, Sm. | ☐ | Vacuum Cleaner | ☐ |

FIG. 4D

| Item | Quantity | Item | Quantity |
|---|---|---|---|
| Dehumidifier | | Trash Compactor | |
| Freezer, Sm. | | Vacuum Cleaner | |
| Freezer, Med. | | Washing Machine | |
| Freezer, Lg. | | Dryer | |
| Microwave Oven | | Dishwasher | |
| Range, 20" Wide | | Computer | |
| Range, 30" Wide | | Monitor | |
| Range, 36" Wide | | Printer | |
| Refrigerator, Sm. | | Scanner | |

Miscellaneous Items

| Item | Quantity | Item | Quantity |
|---|---|---|---|
| Baby Carriage | | Weight Bench & Weights | |
| Exercise Equipment | | Fan | |
| Pool Table | | Ping Pong Table | |

Use the area below to enter any misc items that have not yet been listed.

Item — Cubic Feet — Quantity — Item — Cubic Feet — Quantity
— 0 — — — 0 —
— 0 — — — 0 — 456

Boxes

| Item | Quantity | Item | Quantity |
|---|---|---|---|
| Small Box | | Large Box | |
| Medium Box | | Wardrobe Box | |

[ Calculate My Truck Size ] — 460

450
452
454
42
44
42

PENSKE 10' Economy Van (1 to 2 rooms)

461 { 400 cu. ft. 3,500 lbs. load capacity, Inside length: 10'. Inside width: 6'4". Inside height: 6'. Equipped with EFI engine, automatic transmission, air conditioning, powersteering, power brakes, AM/FM radio, and bucket seats.

474

Accommodates driver and one passenger

What type of truck rental does your move require?

| One-Way Rental | Local Truck Rental |
|---|---|
| Truck that will be returned to a different location when you reach your travel destination | Truck that is returned to the same location at which it was picked up. |
| 10' Economy Van Quote | Local Truck Rental Quote |

462

466 — The truck wizard has recommended a 10' truck. By clicking on the 10' Economy Van quote button, it will take you to the Rental form with a 10' truck preselected. See Photo 2.

Or you can choose Local Truck Rental

Show All Trucks — 463

Back To Update Wizard — 464

- 5 Small Boxes
- 3 Medium Boxes
- 5 Large Boxes
- 2 Wardrobe Boxes
- 1 Roll Packing Tape
- 1 Pack of Rope
- 1 Padlock
- 1 Smart Kart
- 1 Dozen Furniture Pads We provide quantity discounts and will buy back all unused packing materials and accessories so make sure to buy extra, just in case.

| Small Box | Medium Box | Large Box |
|---|---|---|
| 1.5 cu. ft. 16 x 12 1/2 x 12 1/2 | 3.0 cu. ft. 18 x 18 x 16 | 4.5 cu. ft. 24 x 18 x 18 |

465 {

| Wardrobe Box | Smart Kart | Furniture Pads |
|---|---|---|
| 23 3/4 x 21 x 47 3/8 | | 4' x 6' |

Moves large appliances or boxes. Helps prevent back injury. Conveniently rolls up truck ramps. Includes two straps to secure boxes or appliances and a stair climber to move heavy items to a different floor.

Multipurpose Hand Truck

Protect furniture from scratches. Wrap breakables. Protect valuables.

We buy back all unused moving supplies!

FIG. 4E

SYSTEM AND METHOD FOR IDENTIFYING A VEHICLE BASED ON A LOAD TO BE TRANSPORTED

BACKGROUND OF THE INVENTION

The invention relates to a computerized system and method for identifying a vehicle based on a load to be transported and vehicle characteristics. More particularly, the invention relates to such a system and method which store or otherwise have access to characteristics of a number of vehicles, and which identify an appropriate vehicle in response to load information input thereto, e.g., by a prospective user of a prospective vehicle.

Transporting a load with a vehicle appropriate for the load has many advantages. Therefore, where a choice of vehicles is available, an appropriate vehicle should be selected.

The process of identifying a truck appropriate for a move based on a consideration of the particular items to be transported and the vehicles available can be performed manually or using a computer. For example, the web site at http://www.moving.com includes a "weight and volume calculator" that provides a total weight and total volume for a load in response to input by a computer user of items that make up the load. Tables of items are presented for various room types into which a user can enter the number of each listed item. This site also might provide an estimate of a truck size parameter corresponding to the particular set of items input by the computer user. However, this feature, although presented for use, was not operable shortly before this application was filed. ("Size", depending on the context, may encompass volume or weight parameters, or both, e.g., the volume occupied by and/or the weight of a set of items constituting a given load, or the volume and/or weight capacity of a vehicle.)

The "Moving Calculator", available on www.homefair.com, purports to calculate the approximate cost of a residential move based on the following information input by a computer user: the location of the items to be moved and the location to which the items are to be moved, room types having furniture included in the move, family size and number of years at the origin residence. At filing of this application, this "Moving Calculator" did not appear to be operable.

The "Space Estimator" available at www.upack.com calculates a "linear footage required" for moving of a user-specified set of items using trucks provided by the site operator. The calculation is based on selections made by a user from a table of default volume values for various items, the table supplied by the site operator. The user also has the option of defining additional items and specifying their volume. The system does not recommend a truck or truck size for use in transporting the item set.

The "Advanced Truck Size Calculator" available at www.yellowtruck.com recommends a vehicle type based on a checklist of items a user wishes to move. The calculation is based on selections made by a user from a table of default volume values for various items, the table supplied by the site operator. The user also has the option of defining additional items and specifying their volume.

The invention seeks to provide an improved system and method for identifying a vehicle appropriate for a given load.

SUMMARY OF THE INVENTION

The invention provides improved systems and methods for identifying a vehicle appropriate for a given load. In so doing, or independently, the invention provides for improved calculation, estimation or determination of the size of a given load, and for the manner in which a given load is defined. The invention also provides an interactive system and method for providing information regarding items to be included in a given load, and for identifying an appropriate vehicle to transport the items about which information was supplied.

Embodiments of the invention identify an appropriate vehicle based not only on load parameters such as item volume and/or weight but also on at least one other criterion or factor. Other criteria or factors include but are not limited to inefficiencies in packing the vehicle, availability in inventory of a most appropriate and other appropriate vehicles. In preferred embodiments of the invention vehicle identification is accomplished with the assistance of a user interface which allows a user to define one or more items of a load, and/or a user interface which provides graphical representations of items, such as icons, and accepts input of selected item information through interaction with the graphical representations, e.g., "point and click", or "drag and drop", etc., operations. In a preferred embodiment, the graphical representations represent items typically present in a household or office move, such as sofas, chairs, tables, desks, beds, etc., and selection of a particular item is achieved by dragging the item and dropping it in a graphical representation of a vehicle or storage facility.

The invention provides a method performed by a computerized system, and a computerized system, for selecting an appropriate vehicle to transport a given or projected load. A user interface is provided operable for defining characteristics of the projected vehicle load. A size of the load is calculated using characteristics defined with the user interface. A vehicle is identified based on the calculated size of the load and load capacities of vehicles stored by the system or to which the system has access, and on at least one other criterion. Other criteria may include the efficiency with which the load capacity of the transport vehicle is used, including for example either the relative skill with which the vehicle is packed or inefficiencies caused by the number, size, shape and/or weight of large or bulky items, or items which are otherwise difficult to pack or reduce the effectiveness with which the load capacity of the vehicle may be utilized, or the relationship between such items and the particular shape, size, or dimension of the vehicle in which they are to be transported; the need for special handling, storage or transportation conditions of items to be transported, as for example temperature, humidity, pressure, or other climatic or environmental conditions; and the availability of individual vehicles or vehicle classes within a fleet, or at a particular location. Following selection, the identified vehicle is provided to the user interface for presentation to a user. In the preferred embodiment, vehicle identification is based on vehicles for which the system indicates an availability for possible use by a prospective user.

The method and system provide for input by a user of characteristics of a load, or of particular items included in the load, that are relevant in determining the ultimate size of the load and/or the size capacity of the vehicle to be used for transporting the load. Such characteristics include, for example: the quantity and type of items to be included in the load; the volume and weight sizes of such items, represented by dimensions, shapes, weights and volumes; the fragility, flammability, and/or perishability of items; or other characteristics resulting in special packing and/or handling requirements.

One criterion preferably used by systems and methods according to the invention to identify an appropriate or suitable vehicle, and/or to define a required vehicle size capacity for transporting a load considers inefficiencies in packing the load inside the vehicle by a packer or packers. The inventors are aware that there exists a substantial variation in the relative efficiencies of different classes of vehicle packers. There typically exists, for example, a substantial difference in the efficiency with which vehicles are packed by professional movers and by non-professional movers who rent trucks and move their own household or office items. Packing efficiency can be expressed as the ratio of used (or unused) vehicle size capacity and the total or gross available vehicle size capacity. (The higher the used/total capacity ratio, the higher the packing efficiency, and the higher the unused/total capacity ratio, the lower the packing efficiency.) The amount of a vehicle's volume or weight load capacity left unused after an entire load has been loaded into the vehicle can either be measured or estimated. Such inefficiencies can be aggravated by unusual bulk or irregular shapes or dimensions of items to be packed.

The inventors have observed that on average a non-professional vehicle packer uses between about 50% and about 90% of available capacity. On average, such movers have been found to use about 80% of available capacity. To ensure that a mover has an appropriately sized vehicle, the invention preferably takes packing efficiency into consideration in identifying an appropriate vehicle based on user input of load information. Thereby, the invention typically identifies a vehicle having the smallest possible truly accurate load size.

Another criterion used in the identification of vehicles according to the preferred embodiment of the invention is the availability of vehicles within a set of vehicles, based on criteria such as those discussed above. This includes the availability of vehicles within a user-defined set of locations, which might mean, for example, in a single location, or in any one of multiple locations, or in or near one or more such localities. It is often not efficient and therefore not desirable, for example, to suggest to a user a vehicle having an appropriate load capacity for a move in one location when such vehicles are only available in a distant location. The preferred embodiment therefore considers the availability of vehicles in or near the local of the move.

User interfaces suitable for use with the invention employ any satisfactory means of facilitating input, selection or designation by the user of items making up a load. For example, tables, lists, drop-down menus with text and/or graphical representations, etc., which accept data entry may be used. Data entry may include entering a number or selecting an item using a pointing device or keyboard. In addition, in the preferred embodiment, data input fields are provided for receiving descriptions and/or size information of user-defined items and quantities thereof.

One user interface mentioned above provides graphical representations of items and accepts input from a user to designate the items, e.g., by "point and click" or "drag and drop" operations using a mouse or digitizer device. For example, the "drag and drop" feature used in many applications is particularly well adapted for use with systems according to the invention. Graphical representations of various items such as items of household or office furniture may be provided on a computer monitor screen, and a mouse used to select them and drag them into a graphical representation of a vehicle or vehicle loading space. Upon being dropped in the vehicle, the item, with its associated characteristics, is input as a load item.

A method provided by the invention includes the following: providing a user interface including a plurality of selectable items, such as for example graphical representations of household or office furniture; receiving input of user selected items; identifying an appropriate vehicle from a set of vehicles based on a size determined from information associated with each input item and load capacities of the vehicles; and presenting information related to the identified vehicle via the user interface. The set of vehicles may include all vehicles in a system, or only vehicles available within a particular locality at a particular time. The method may retrieve one or more dimensions, volumes or weights associated with the items, and process the retrieved information to determine a size of the load. The method may then select a vehicle capable of accommodating the load, optionally taking into consideration a packing efficiency. Optionally, the method may, prior to identifying an appropriate vehicle, present interim results via the user interface, e.g., total volume or weight. Such interim results may be presented on an intermittent or running basis, for reference by the user during the process of inputting load items; and/or may be stored for later use, together with a data set of items and item characteristics entered by the user, as for example to allow a user to log off during an interrupted session but to resume at a later time without having to reenter previously input data.

A computer system provided by the invention includes the following: a client system having an input device, e.g., a mouse, digitizer and/or keyboard, and an output device, e.g., a computer monitor or printer. A user uses the input device to input information related to items of a projected load. The system also includes a server system coupled to the client system. The server system includes a controller and application programming logic, executable by the controller in response to requests ("request" includes, for example, commands and instructions) from the client system. The application programming logic is adapted for processing load information received from the client system, identifying an appropriate vehicle based on the load information load size, capacities of vehicles within a set of vehicles (as discussed above), and at least one other criterion, such as described herein; and presenting information identifying the identified vehicle on the output device.

Data processing systems according to the invention may also include user interfaces presented on the output device. In one embodiment, the user interface includes a plurality of fields for receiving information defining the load. For example, the plurality of fields may include a description of an item within a predefined inventory of items and a field for receiving a quantity of the predefined items to be included in the load. The plurality of fields may also include a field for receiving a description of a user-defined item, a field for receiving a quantity of the user-defined item to be included in the load and a field for receiving a measurement of a size or dimension of the user-defined item. In another embodiment the user interface includes a plurality of graphic representations that are selectable for identifying items within the load. For example, the graphic representations may include an alphabetic and/or numeric character, a symbol or multimedia object. Characteristics of the items represented, such as volume and/or weight sizes, may be associated with the graphic representations as information relating to projected transport loads, for use in identifying vehicles suitable for transporting the loads as described herein.

BRIEF DESCRIPTION OF THE DRAWINGS

The features and advantages of the present invention will be better understood when the Detailed Description of the Preferred Embodiments given below is considered in conjunction with the figures provided, wherein:

FIGS. 2A–2C depict portions of a data store including information for defining and transporting a load according to the invention;

FIGS. 4A–4F depict a user interface screen operating in accordance with one preferred embodiment of the present invention.

In these figures, like structures and functions are assigned like reference numerals, but may not be referenced in the description for all figures.

DETAILED DESCRIPTION OF THE PREFERRED EMBODIMENTS

For purposes of this disclosure the term data processor or data processing system means any computer or other processing system, preferably automatic, suitable for implementation of the methods and processes disclosed herein.

Figure 1:
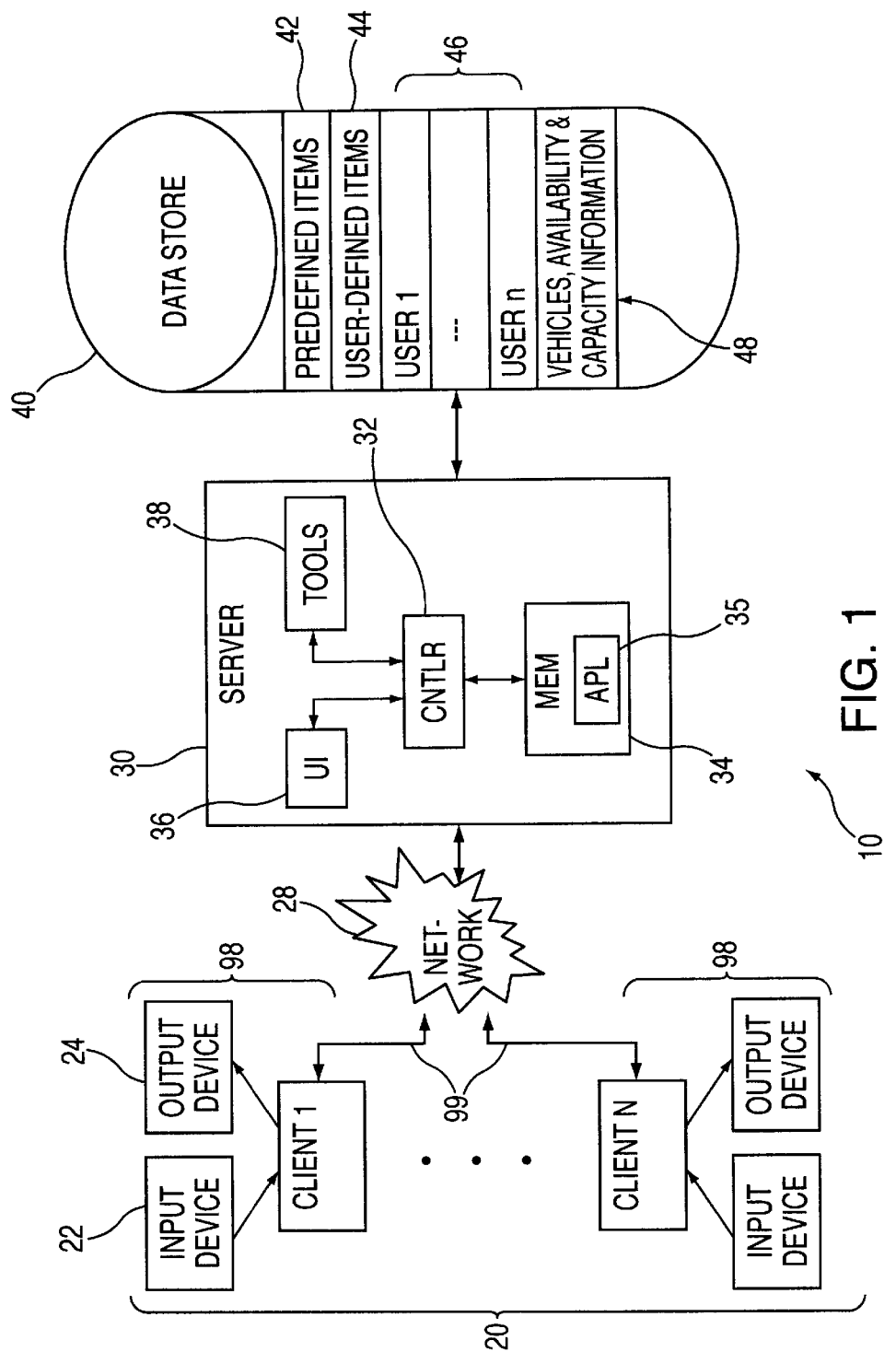
FIG. 1 is a block diagram of a computer system constructed and operating in accordance with one embodiment of the present invention.

FIG. 1 illustrates a client/server computer or data processing system 10 configured and operating in accordance with the present invention to implement methods and processes, as described herein, for selecting an appropriate vehicle for transporting a user-defined load. The computer system 10 includes a plurality of client systems, shown generally at 20, coupled to a server system 30 through a communication network 28 such as, for example, the Internet, an intranet or an extranet. Plurality 20 of client systems 98 includes remote and/or local client computer systems coupled to the communication network 28 over wired or wireless connections 99. Each of the client systems 98 includes an input device 22 and an output device 24. The input device 22 includes, for example, a keyboard, mouse, touch-sensitive screen, electronic stylus or one or more other conventional input devices for inputting information to the client computer system 98. The output device 24 includes, for example, a display device or monitor, a printer or other conventional output devices for receiving and presenting information to users of the client computer system 98.

Server 30 includes a controller (CNTLR) 32 such as a microprocessor and a memory device (MEM) 34 having, for example, ROM, RAM and/or non-volatile memory components for storing application programming logic (APL) 35, variables and/or parameters used during operating of the CNTLR 32. Server 30 also includes a user interface application program (UI) 36, which, working through input devices 22 and output devices 24, provides a user interface for each of client systems 98. Server 30 further includes load definition and vehicle selection tools (TOOLS) 38, further described below. The CNTLR 32 is coupled to and controls the operation of and interaction between MEM 34, APL 35, UI 36, TOOLS 38 and a data store 40. Preferably, the UI 36 is implemented as an Internet web site hosted by the server 30 and the CNTLR 32, UI 36, TOOLS 38 and data store 40 are implemented in an Internet-based environment.

In the Internet environment, the server 30 receives data, requests, and instructions as input from the plurality of client systems 20 over the communication network 28. Upon receipt of an appropriate instruction or request from one of the plurality of client systems 20, server system 30 invokes the APL 35 and presents the UI 36 (e.g., the web site) to the requesting client system. FIGS. 4A–4F and 5A–5D depict screen displays 400 and 500 provided by the UI 36 to the requesting client computer system. As described below, the screen displays 400 (FIGS. 4A–4F) and 500 (FIGS. 5A–5D) include command "buttons" 402 and 502 and other multimedia objects for applying the load definition and vehicle selection techniques (e.g., TOOLS 38) of the present invention.

As shown in FIG. 1, the data store 40 is coupled to the server 30. Data store 40 includes a predefined inventory of items 42 such as, for example, tables, chairs, desks, beds, appliances, boxes, personal and business furniture and equipment, and the like, and associated characteristics. The data store 40 includes non-volatile memory components such as, for example, a hard disk, floppy disk or optical disk drives that are located in a same facility as the server 30 or interconnected with the server 30 over for example a communication network such as the communication network 28. Preferably, the TOOLS 38 include features and functions for inputting and storing user-defined items 44 within the data store 40. For example, a user may need to transport a particular object that is not included within the predefined inventory of items 42. The TOOLS 38 include functionality, therefore, for enabling the user to include the particular item within the set of user-defined items 44 by providing, for example, a description of the particular item. Description of items (e.g., items 42 and 44) within the data store 40 include characteristics such as measurements, for example, length, width and height dimensions, weight, volume, etc. FIG. 2A illustrates schematically a portion 100 of data store 40 which includes exemplary items (e.g., items 42 and 44) and associated characteristics 199. It should be appreciated that in a particular implementation of the present invention other measurements and/or characteristics, such as special handling or packing requirements may be associated with the items 42 and 44 that are included within the data store 40.

Additionally, and as described in further detail below, the APL 35, UI 36, TOOLS 38 and data store 40 may cooperate to associate a particular set or number of items within the inventory of items 42 and 44 with one or more of the plurality of client computer systems 20 (e.g., users 1 to n). As should be appreciated, a client invokes the APL 35, which in turn invokes UI 36 and TOOLS 38, to define a load that the client desires to transport from among the items 42 and 44 stored in the data store 40. FIG. 1 depicts the items selected by and associated with the clients (e.g., users 1 to n) generally at 46. The selected items 46 represent user-defined loads input utilizing one of the plurality of client systems 20. FIG. 2B illustrates data records corresponding to a user-defined load, shown generally at 120, that is associated with a user of one of the plurality of client computer systems 20. Preferably, the user-defined load 120 includes information for identifying the user (e.g., a user ID field 60), items 42 and 44 selected by the user (e.g., an item ID field 64) and quantities of the selected items 42 and 44 (e.g., a quantity field 66). The user ID field 60 may include, for example, an email address, unique user identification number such as an account number, or another mechanism as is generally known for permitting storage by a server of information of a user that may be retrieved at a period of time after entry by the user. Association of data records with individual users or clients facilitates, among other things, the storage of such records for later retrieval by the user or client, in the event a data entry or load analysis session is interrupted.

The TOOLS 38 include application programming logic for processing data or other information related to items 42, 44 to determine a size of a load (e.g., a user-defined load 120 illustrated in FIG. 2B) projected to be transported by, for example, accumulating measurements of a user-defined set of items (e.g., items 46 selected from the items 42 and 44 and associated to the user, e.g., users 1-n). The accumulated measurement may represent a total volume and/or weight of the user-defined set of items. The TOOLS 38 also include application programming logic for comparing the accumulated measurement to the capacities of available vehicles and for selecting and suggesting an appropriate sized vehicle based on the comparison, and optionally on at least one additional criterion. In one embodiment, the data store 40 may include information, shown generally at 48 (FIG. 1), including an inventory of vehicles, their availability at one or more locations, and each vehicle's capacity. FIG. 2C illustrates a portion 130 of data store 40 which includes the inventory of vehicles 48. It should be appreciated that it is within the scope of the present invention for the vehicle inventory, capacity and/or availability information to reside in another computer processing system. As such, the APL 35 may include logic for retrieving the information from the other computer processing system on an as-needed basis. Preferably the data record associated with each vehicle includes a current or projected location of the vehicle (not shown).

As described above, a user of the computer system 10 such as, for example, a do-it-yourself mover, utilizes the input device 22 of one of the plurality of client computer systems 20 to invoke the APL 35. In response to a request from one of the client systems 20, the APL 35 presents the UI 36 such that by working with input device 22 and output device 24 the user may input information defining a load to be transported and invoke the TOOLS 38 to determine an appropriate sized vehicle to transport the load.

Figure 3A:
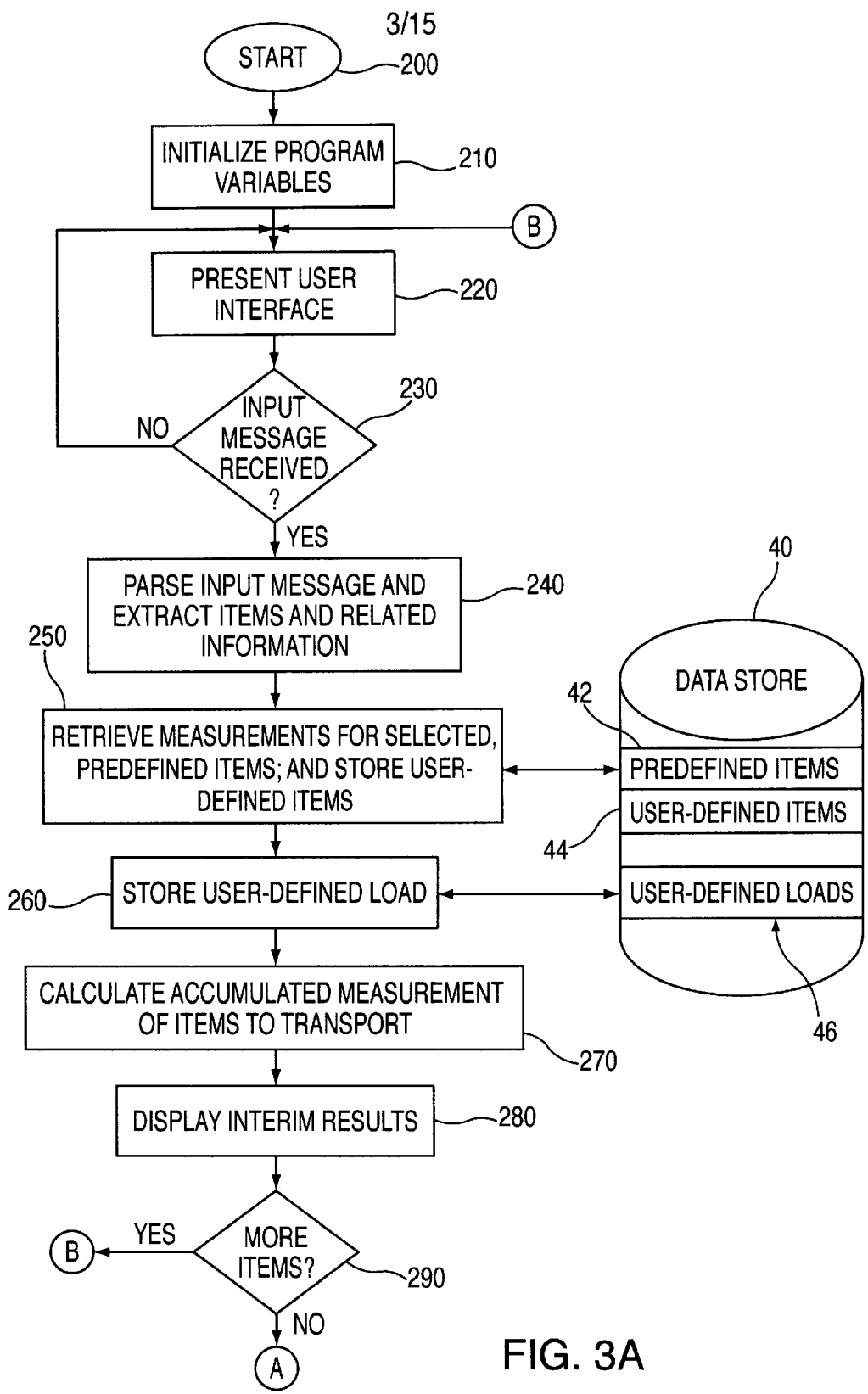
FIGS. 3A–3B is a flow diagram illustrating operations of application programming logic incorporating techniques, in accordance with one embodiment of the present invention, for selecting an appropriate vehicle for transporting a user-defined load.
Figure 3B:
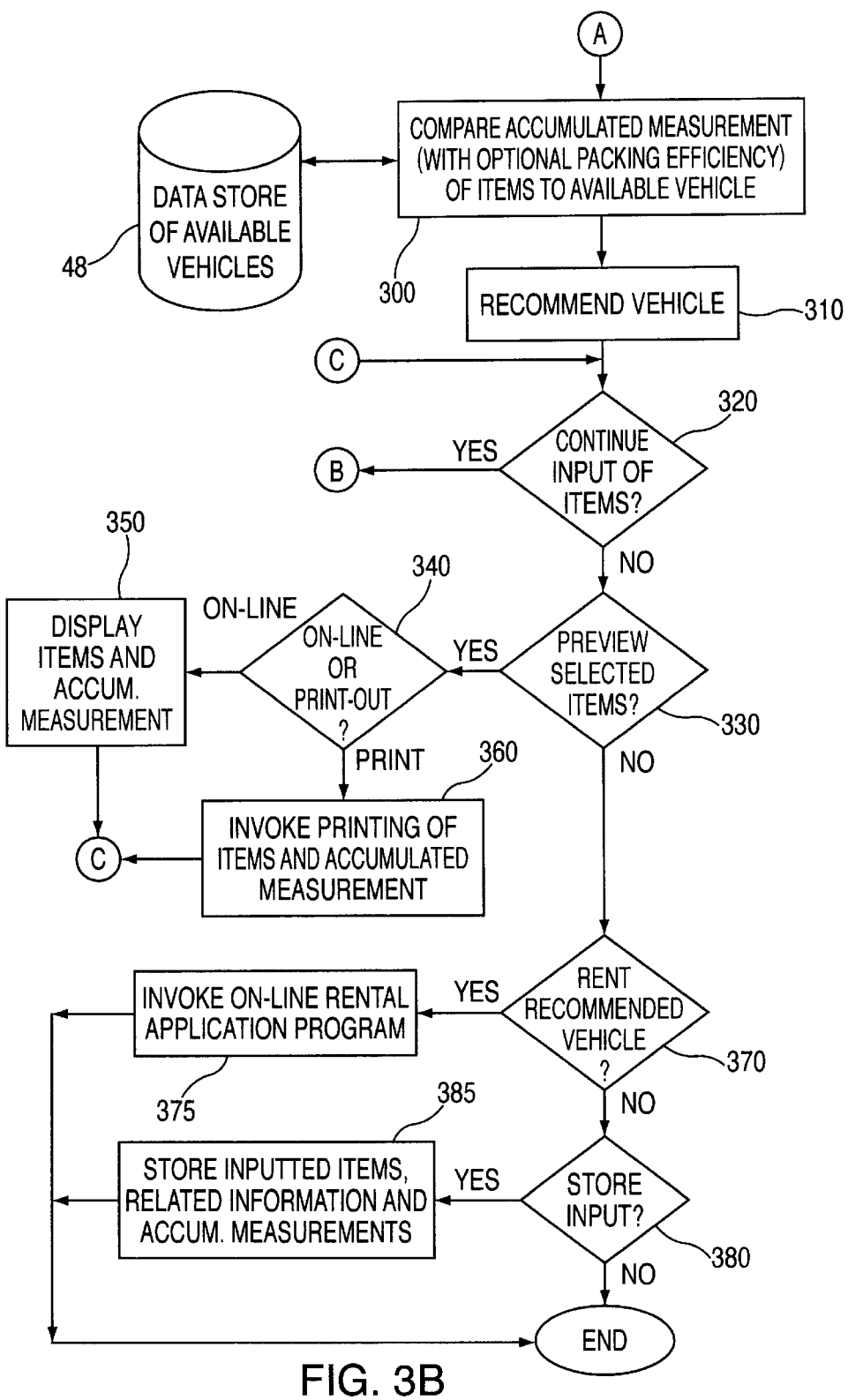

One embodiment of a method for defining a load and selecting an appropriate vehicle for transporting the user-defined load is illustrated in FIGS. 3A and 3B. At Block 200 of FIG. 3A the CNTLR 32, in response to a request from one of the client systems 20, retrieves and executes the APL 35. Once program variables are initialized (at Block 210), the APL 35 presents the UI 36 to the user via the output device 24 of the requesting client system 20 and invokes TOOLS 38 (Block 220). The UI 36 and TOOLS 38 cooperate to assist the user in defining a load to be transported by, for example, selecting items 42 and/or define items 44 from the presented user interface screen. For example, the UI 36 may include a brief description or graphic representation of the items 42 and 44 stored within the data store 40. As is known to those skilled in the relevant art, the graphic representations may include, for example, alphabetic and/or numeric characters, symbols or other objects (e.g., icons) that are selectable by the user to define the load.

Figure 4A:
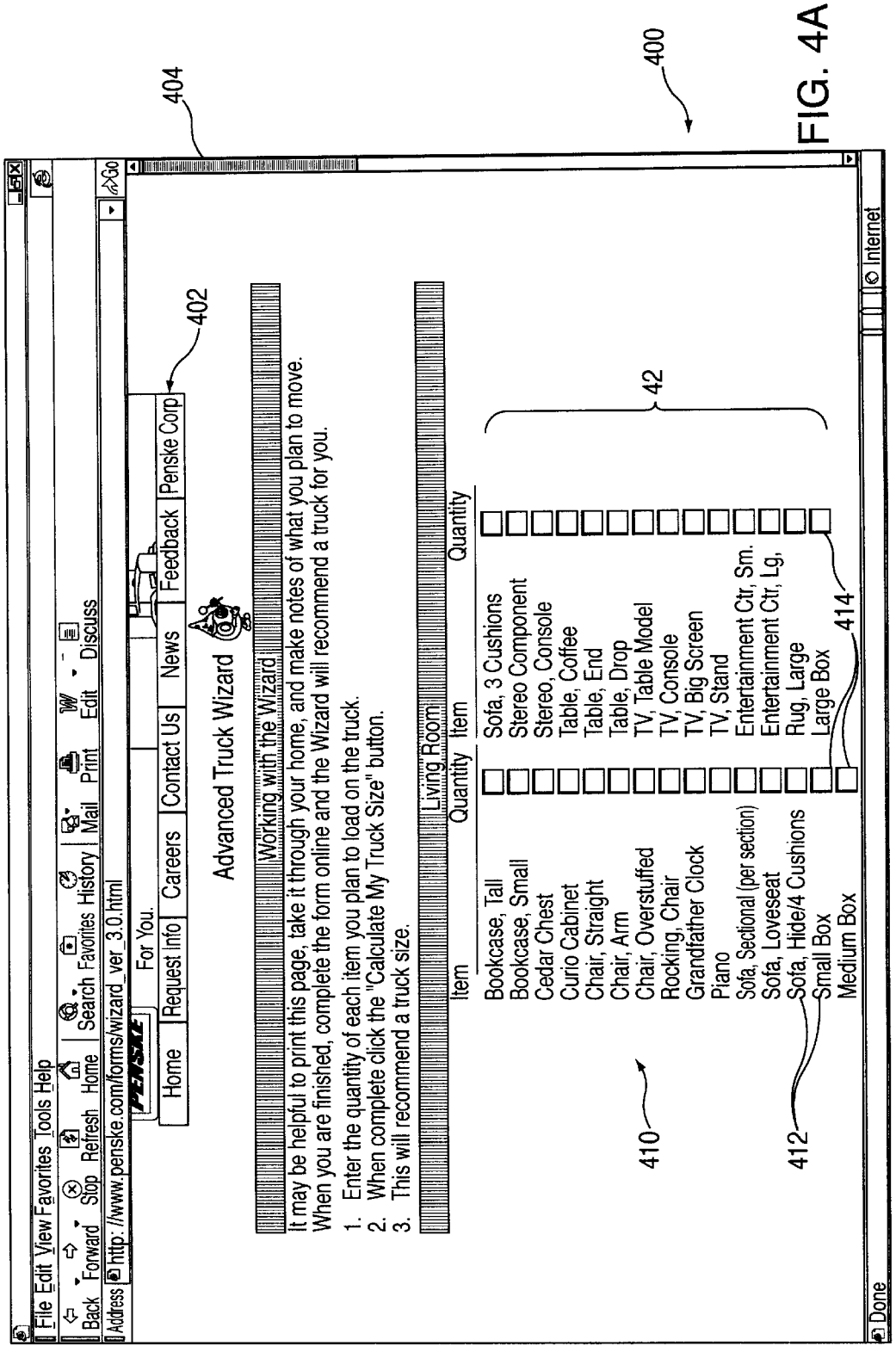

One embodiment of the UI 36 is illustrated in FIGS. 4A–4F. In FIG. 4A a UI 400 includes lists of items that the user may review to define the load to be transported. For example, FIGS. 4A–4F depict lists (e.g., checklists 410, 420, 430 and 440) of the predefined items 42 from which a user may review by, for example, paging through and/or manipulating a scroll bar 404, to identify items within their home or business to be transported. In one embodiment, and merely for the convenience of the user, the lists 410–440 are organized to correspond to rooms within a home, for example, a living room (list 410), a kitchen (list 420), dining room (list 430), office/den (list 440), etc. The lists of predefined items 42 include a brief description 412 of each item and a field 414 for receiving an inputted quantity of the item that the user intends to transport. Optionally, lists 410 provide simple check boxes for indicating that one or more list items are included in the load set. To identify an item as part of a projected load, the user uses input device 22 to designate and select the item. For example, the user can use a computer mouse to place a cursor on an item to be designated, or within a check box associated with the item (that is, to "point" at the item), and activate a mouse control to select the item (that is, "click" on the item). Use of an input device in such manner to select or designate an item on an interface screen is commonly referred to as a "point and click" operation. For the user-defined items 44, the UI 400 includes a list 450 (FIG. 4D) having fields for receiving a brief description (e.g., field 452), a quantity to be transported (e.g., field 454) and a size measurement preferably expressed as a volume including a cubic feet measurement (e.g., field 456). After completing one or more of the lists of the UI 400 (e.g., lists 410–450) the user triggers the generation of an input message containing the items that the user selected. As shown in FIG. 4D, the selection of a command button 460 labeled "Calculate My Truck Size" triggers the generation and transmission of an input message to the APL 35 for further processing at Block 230 as described below.

FIG. 4E depicts a representative interface screen image produced as a result of selecting command button 460 in FIG. 4D. In the example shown in FIG. 4E a load of less than 400 cubic feet (after application of any efficiency factors) and less than 3,500 pounds has been designated. A suitable truck is recommended at 461. The recommendation comprises graphical representation 474 of the recommended vehicle. At 462 an optional sequence for refining and/or confirming selection and facilitating rental of the recommendation commences. At 462 the user is queried as to whether a one-way or local rental is desired, and at 463 the user is enabled to access information relating to all available vehicles, and optionally to overide the recommendation given at 461 and select another vehicle. At 464 the user is enabled to return to the item selection/designation process, as for example where additional items are to be selected or even removed from the designated load by resetting quantities entered in boxes 414 to zero. At 465 a list of recommended accessories is displayed. Such a display might show, for example, a recommended number of various-sized boxes, packing tape or excelsior, rope or bungee cords for tie-downs, devices such as padlocks for securing the back of a truck after loading, hand trucks for loading the vehicle, and furniture pads.

Figure 4F:

Selection of "one-way rental" item 466 in FIG. 4E results in presentation on the user interface screen of a rental interface screen such as that shown in FIG. 4F. As shown at 467, the rental screen is preferably set with default entries corresponding to the recommendation made at 461. At 468 entry of user/renter identification and payment information is accepted, as well as point of origin and destination. A pickup date may be entered at 469. Additional options such as towing requirements are accepted from pull-down field 470. Accessories such as hand trucks, furniture pads, and other items such as those described above may be ordered through use of fields 471. Additionally, insurance options are offered at 472. Selection of item 473 results in acceptance and optionally verification of the rental agreement.

Figure 5A:
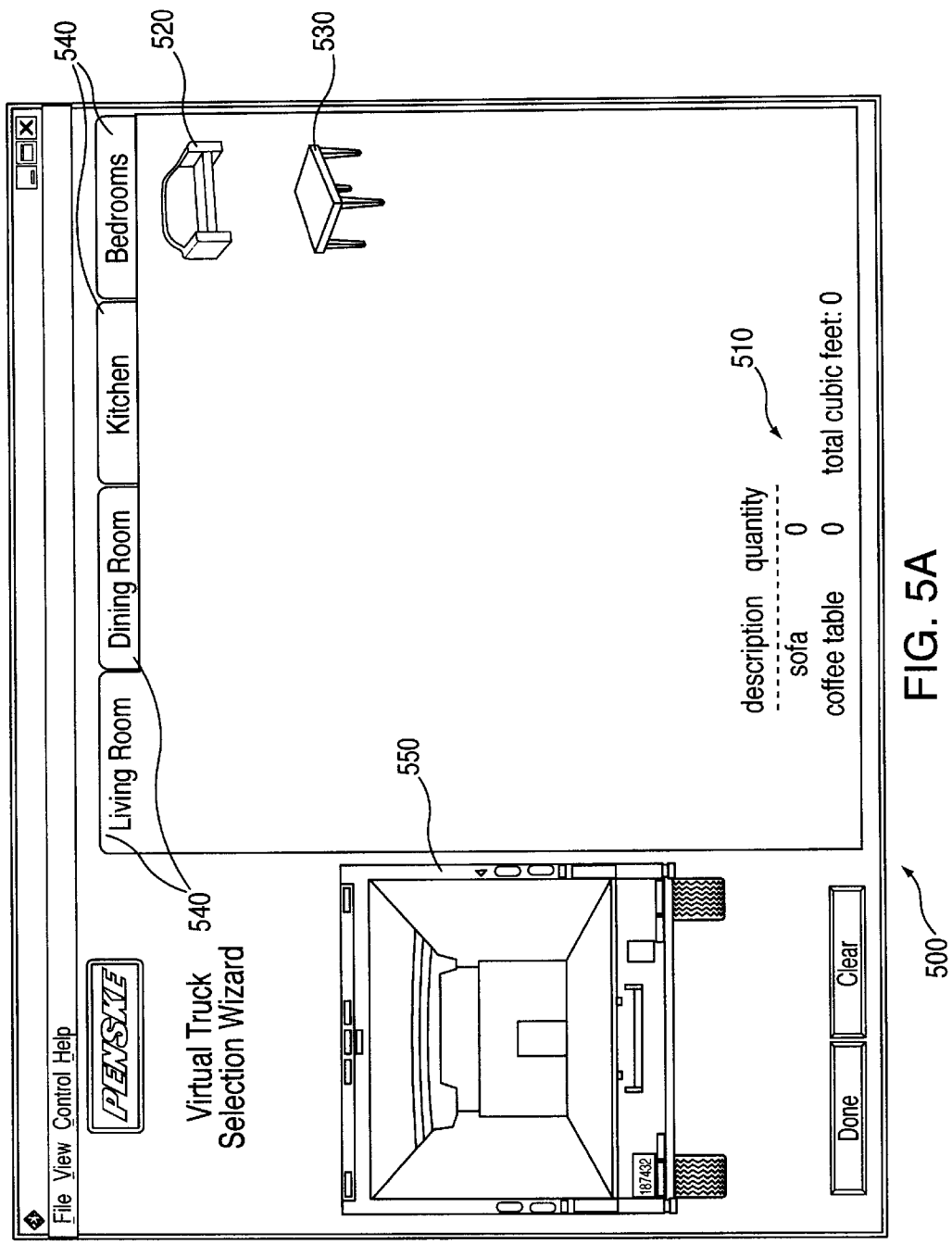
FIGS. 5A–5D depict a user interface screen operating in accordance with another preferred embodiment of the present invention.
Figure 5B:
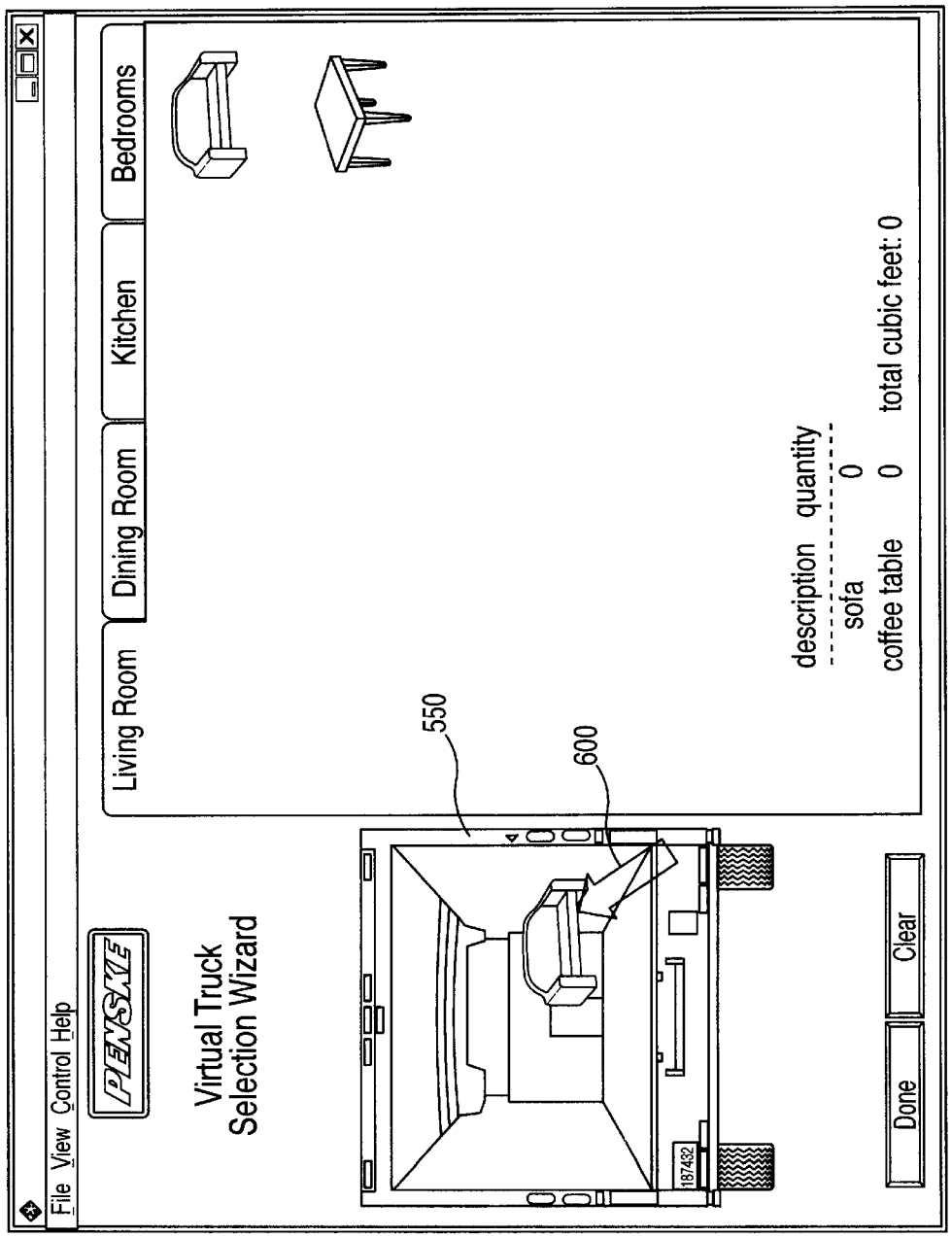

FIGS. 5A–5D illustrate another embodiment of the UI 36. In FIGS. 5A–5D a UI 500 is depicted that may be presented to a user in response to a request received at the server 30 (e.g., Block 220). The UI 500 includes an interactive presentation of objects that the user may select to define items within the load to be transported. For example, FIG. 5A includes graphic representations 520 and 530 of items within the inventory of items 42 and 44 of data store 40. In one embodiment, categories of items may be viewed by selecting tabs 540 representing various rooms within an individual's home or office. To include an item within a user-defined load, the user utilizes the input device 22 (e.g., a pointing device such as a mouse) to select (e.g., "click on") one of the graphic representations (or "objects") representing the items. Once selected, the object (e.g., object 520) may be moved about ("dragged") the interface screen with a cursor 600 controlled by the input device (FIG. 5B). The user includes the selected object within the user-defined load by positioning the cursor over a portion 550 of the UI 500 representing a vehicle selected to transport the load and activating an input device control to fix (or "drop") the object within the vehicle representation portion 550 of the UI 500. The aforementioned selecting, moving, and positioning operation is commonly referred to as a "drag and drop" operation. As with the selecting of the command button 460 of FIG. 4D, the drag and drop of an object onto the portion 550 of the UI 500 generates an input message to the APL 35. Accordingly, in response to the input message, processing continues at Block 230. Optionally completion of the load definition process and identification of a recommended vehicle are signaled by a graphic symbol of the completion, such as for example an animate depiction of the closing of a door image or image set at the back of vehicle image 660.

At Block 230 of FIG. 2 the APL 35 determines whether an input message was received from the user. If not, control passes back to Block 220 where the UI 36 (e.g. UI 400 or UI 500) remains displayed on the output device 50. If an input message was received, then control passes to Block 240 where information within the input message is parsed for processing such as described below. The input message generally includes the information provided by the user to define the load to be transported. For example, the information parsed from the input message may include quantities of selected, predefined items 42 and/or descriptions, quantities and input measurements of user-defined items 44. At Block 250 measurements for the selected, predefined items 42 are retrieved from the data store 40. Next, the information related to the user-defined items 44 (if any) is stored in the data store 40. In one embodiment, entries are also made in the data store 40 (at Block 260) such that the items selected (items 42) or defined by the user (items 44) during a particular execution of the APL 35 are associated with the user for later identification with the user and retrieval, as for example in the case of an interrupted session. As described above, the entries represent the user-defined loads 46, one embodiment of which is illustrated in FIG. 2B. Preferably, the user-defined loads 46 are accessible as the data store 40 includes the user ID field 60, the item ID field 64 for cross-referencing each item to its complete description within the data store 40, and the quantity field 66 for determining a size of the user-defined load.

At Block 270 the TOOLS 38 collect measurements and quantities of the selected predefined items 42 and the user-defined items 44 and calculate an accumulated measurement to determine a size of the load. For example, the TOOLS 38 may calculate a total cubic volume and/or total weight of all of the selected, predefined items 42 and user-defined items 44 according to the following formulas:

$$\text{Volume of an Item} = \text{Length} \times \text{Width} \times \text{Height of the Item};$$

Total Volume of Load=Σ(Volume for each selected, predefined item and each user-defined item×Quantity of selected predefined items and user-defined items); and Total Weight of Load=Σ(Weight of each selected, predefined item and each user-defined item×Quantity of selected predefined items and user-defined items).

Length, width, height, and other dimensions may be maximum, minimum, average, or other dimensions, depending upon the nature and quantity of the items and the characteristics of the vehicles to be used to transport them.

At Block 280 an optional step may be implemented wherein interim results are presented to the user. For example, the UI 500 includes an area 510 wherein user-defined load information is displayed (FIG. 5A). The information may include a running item-by-item description of the load, with corresponding quantity information and accumulated volume and/or weight calculations. As described below, the load information displayed in area 510 is modified as the user continuously redefines the intended load.

After displaying the interim results, if desired, control passes to Block 290 where the user is asked whether they wish to define more items for inclusion within the user-defined load. If the user chooses to enter more items, control passes back to Block 220 (via a connector labeled "B"). The UI 36 is again presented to the user and predefined or user-defined items may again be selected. In this respect, reference is made to FIGS. 5A–5D which depict an interactive process of defining a load.

For example, FIG. 5A represents the beginning of a load definition process where the portion 550 of the UI 500 representing the vehicle to transport the load does not contain any items. This fact is also illustrated, for example, in that the area 510 includes zero quantities of selected items. As described above, FIG. 5B illustrates selection (with the cursor 600) of a first item of a user-defined load by depicting the drag and drop of a sofa object (e.g., object 520) into the portion 550 of UI 500. In response to the selection of the object 520, the APL 35 updates area 510 with values representing the user-defined load. For example, as a result of the aforementioned processing at Blocks 240–280 of FIG. 3A, quantity fields 630 and an accumulated measurement field (e.g., total cubic feet field 640) reflect the addition of the sofa object 520 to the user-defined load.

Figure 5C:
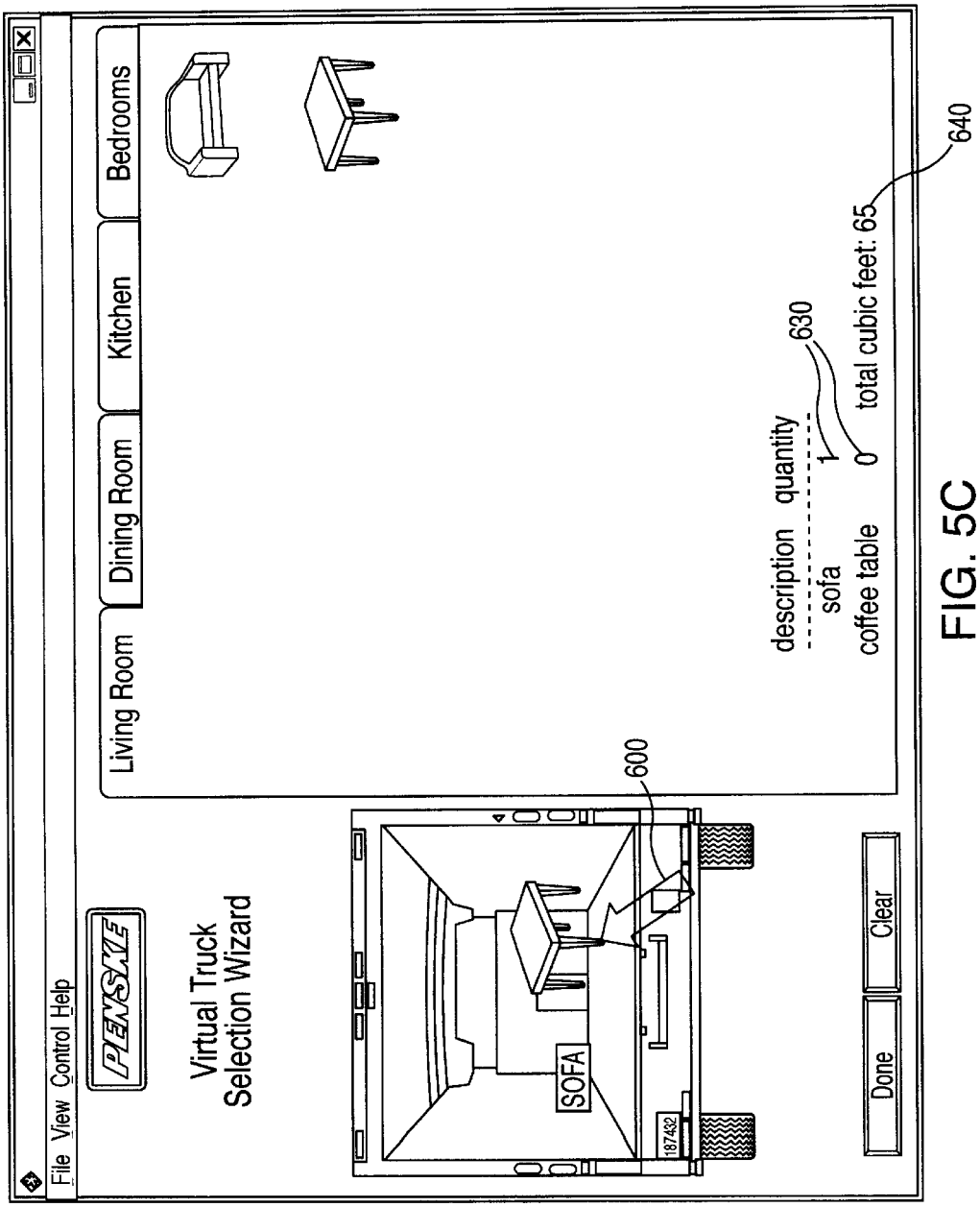
Figure 5D:
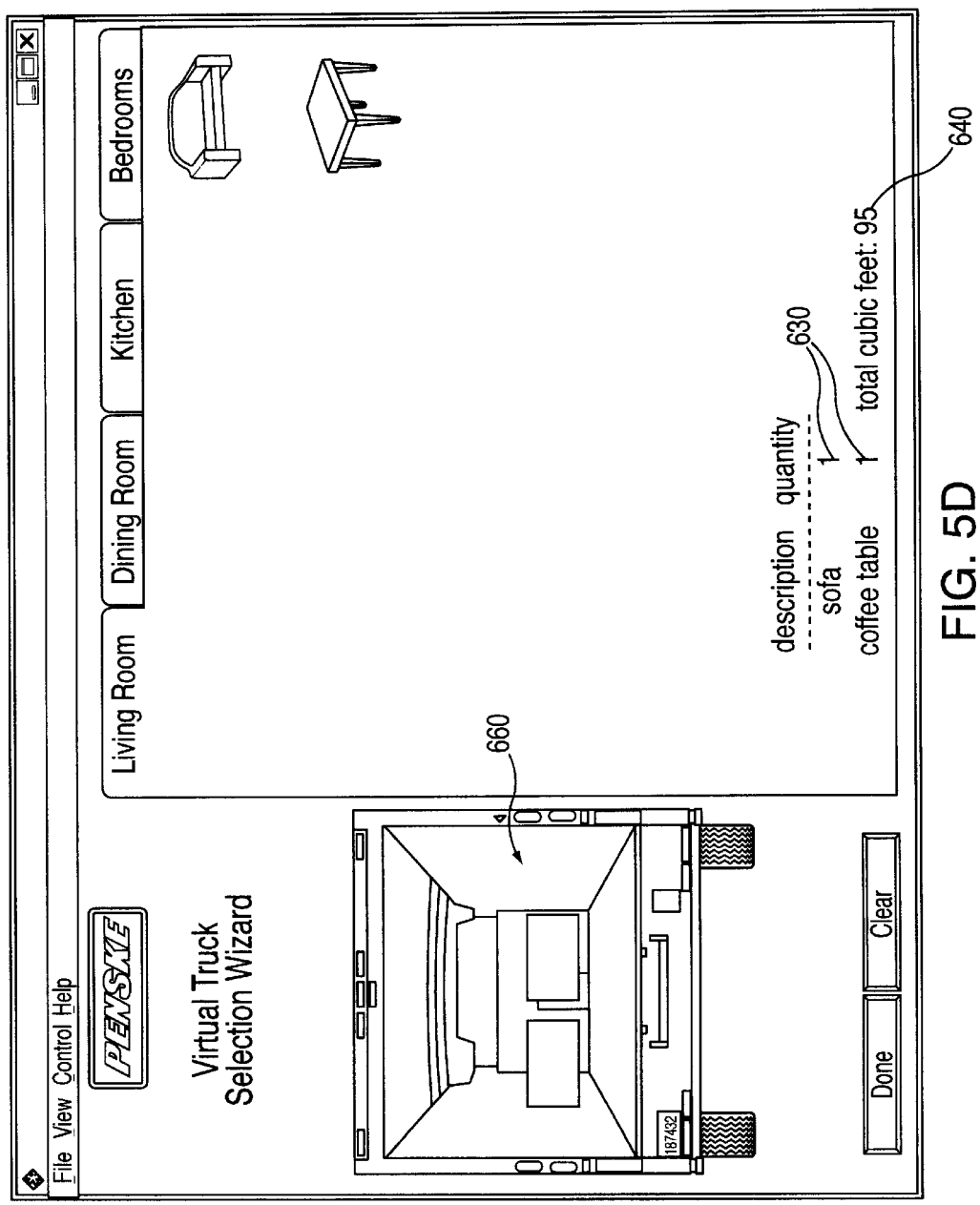

FIG. 5C also illustrates the continuous definition of the load (processing at Block 290 passing control back to Block 220) as it depicts the selection of a second item, e.g., a coffee table object 530. As the coffee table object is dragged and dropped (with cursor 600) onto the portion 550 of the UI 500 the APL 35 updates the area 510 to reflect the addition of the second item to the user-defined load. For example, the quantity fields 630 and the accumulated measurement field 640 are updated accordingly (FIG. 5D). In a preferred embodiment, the portion 550 of the UI 500 includes graphic representations, shown generally at 660, of the objects 520 and 530 within the user-defined load.

If the user chooses not to select more items, then control passes from Block 290 to Block 300 of FIG. 3B (via a connector labeled "A") where a suitable vehicle to transport the load is selected. Optionally this is indicated on the screen graphically by, for example, an animated closing of the back door of the truck illustration of portion 550 in FIGS. 5A–5D, or by an animated image of the truck driving away from the user, prior to repainting of the screen to present information regarding a recommended vehicle class. At Block 300, the accumulated measurement (e.g., total cubic volume and/or total weight of all of the selected predefined items and user-defined items) is compared to the inventory of vehicles 48 available to transport the load. For example, the accumulated measurement may be compared to a load capacity of each vehicle within the inventory of vehicles 48. As shown in FIG. 2C, the load capacity of each of the vehicles may be expressed in at least one of, for example, a number of rooms (field 132), cubic volume (field 134) and a total weight (field 136). As a result of the processing at Block 300, a vehicle having capacity to transport the load is selected.

Optionally the selection of a recommended vehicle further includes consideration at Block 300 of vehicle availability at one or more times and locations specified by the user. For example, this can involve narrowing the selection process to consider only vehicles within the inventory of vehicles 48 that are presently available for renting or leasing at a particular, user-defined location. Accordingly, a larger vehicle may be selected from the inventory 48 than otherwise would have been selected based solely on a load capacity basis, if the larger vehicle is the only suitable available vehicle at the user-defined location. As described briefly above, the APL 35 may include application programming logic to query and retrieve vehicle availability information for computer processing systems other than system 10. For example, the APL 35 may query a centralized vehicle availability system operating within server 30. Alternatively, the APL 35 may query a vehicle inventory and availability system operating at another location on the network 28, for example, at a rental or leasing dealer located in proximity to the requesting client computer system 20.

Optionally the comparison of load size and vehicle capacity at Block 300 comprises consideration of a relative anticipated packing efficiency of the prospective packers, and adjustment of the calculated load size or vehicle capacity, or the comparison thereof, accordingly. In some preferred embodiments, the comparison and selection process assumes that a predetermined percentage of a load capacity of a suitably sized vehicle is not effectively utilized during transportation of the load, and increases the recommended vehicle capacity accordingly. For example, the process assumes that about eighty percent (80%) of the vehicles' actual load capacity is utilized during a move due to inefficient packing by the user (e.g., do-it-yourself mover), and increases recommended vehicle capacity by dividing the total volume (or weight) of the designated load by 80% (i.e., increasing nominal recommended capacity by 25%).

In other embodiments the consideration of packing efficiency is further refined by using different efficiency factors for different size vehicles. For example, in a case involving a fleet comprised of four different size trucks, designated 10', 15', 20', and 25' trucks respectively, an 80% efficiency factor is applied to the three smallest trucks, and a 90% factor to the largest. The factor is applied after the total volume of desigriated items to be moved has been calculated, and a truck size recommended accordingly, according to the following:

10' truck—total calculated volume is less than 80% of the 10' truck's capacity.

15' truck—more than 80% of 10' truck's capacity, but less than 80% of 15' truck's capacity.

20' truck—more than 80% of 15' truck's capacity, but less than 80% of 20' truck's capacity.

25' truck—more than 80% of 20' truck's capacity, but less than 90% of 25' truck's capacity.

Where more than 90% of the 25' truck's capacity is required, a recommendation is made that the user use more than one truck, and preferably that the user contact the vehicle provider, such as for example a leasing or rental company, to discuss most efficient options.

In cases in which interim load accumulations are displayed, an efficiency factor may be applied after selection of each item, as for example at steps 270 or 280, and the displayed interim result adjusted accordingly.

It is stressed that it is within the scope of the present invention to utilize other percentages as estimates of the actual load capacity that is not effectively used during an actual move. For example, it is within the scope of the present invention to use more or less than the aforementioned 80% or 90% allocation variables to select a suitably sized vehicle.

At Block 310 the vehicle selected at Block 300 is displayed to the user. At Block 320 the APL 35 prompts the user to determine whether the user wishes to continue selecting items within the user-defined load. If the user wishes to continue including items within the load, control passes along a "YES" path from Block 320 via a connector labeled "B" to Block 220 of FIG. 3A. At Block 220 the UI 36 is redisplayed and the user may continue entering items within the user-defined load (as described above with reference to FIGS. 5A–5D, for example). Otherwise, control passes along a "NO" path from Block 320 to Block 330.

At Block 330 the APL 35 prompts the user to determine whether the user wishes to preview the items currently selected within the user-defined load. If so, control passes from Block 330 to Block 340 along a "YES" path. At Block 340 the APL 35 prompts the user with a number of options for previewing the user-defined load. For example, the user-defined load may be displayed on the output device 24 of the user (Block 350), printed out a report including the selected items and the accumulated measurement of the load (Block 360) or the APL 35 may otherwise communicated the load information to the user. Once the user previews the load, control passes back to Block 320 (via a connector labeled "C"), where the APL 35 prompts the user to determine whether the user wishes to enter additional items within the user-defined load.

Referring again briefly to Block 330, if the user does not wish to preview the user-defined load, control passes from Block 330 to Block 370 along a "NO" path. At Block 370 the APL 35 prompts the user to determine whether the users wishes to invoke an automated process for reserving the vehicle recommended (at Block 310) by the APL 35 for transporting the user-defined load. If the user wishes to reserve the recommended vehicle, control passes along a "YES" path from Block 370 to Block 375. At Block 375 the APL 35 executes application programming logic to rent, lease or otherwise reserve the recommended vehicle to transport the load. Preferably, the APL 35 invokes application programming logic described in a commonly assigned, co-pending U.S. patent application Ser. No. 09/459,189, titled "ON-LINE TRUCK RENTAL AND RESERVATION SYSTEM AND METHOD," to perform an on-line transaction to reserve the recommended vehicle from a location in proximity to the user. The disclosure of this commonly assigned and co-pending patent application is incorporated by reference herein in its entirety.

If the on-line transaction is not invoked, then control passes from Block 370 to Block 380 along a "NO" path. At Block 380 the APL 35 presents the user the option of storing the information the user entered to define the load (e.g., the items 46 associated to the user and the corresponding measurement information). If the user chooses to store the load information, control passes along a "YES" path from Block 380 to Block 385. At Block 385 the load information is stored. Otherwise, if the user does not wish to store the load information, control passes along a "NO" path and execution ends. The stored information may be retrieved at a later time such that, for example, the user may continue adding to the load information after a further inspection of items for transport.

In an alternative preferred embodiment suitable for implementation of systems according to the invention over the Internet, APL 35, UI 36, and suitable portions of TOOLS 38 are written together in a package which is downloaded from server 30 to client systems 98 for execution on the client systems. In such embodiments program execution occurs locally on client systems 98, and input and output data which would otherwise be required to be stored in data store 40 are preferably stored in local volatile or permanent memory on client systems 98, at least up to the step facilitating rental of a vehicle in block 370 of FIG. 3. For example, programs written in the Java or Javascript programming language developed by Sun Microsystems or using the Flash programming technology developed by Macromedia, and adapted for implementing the methods and processes described herein, can be used to advantage.

Figure 6:
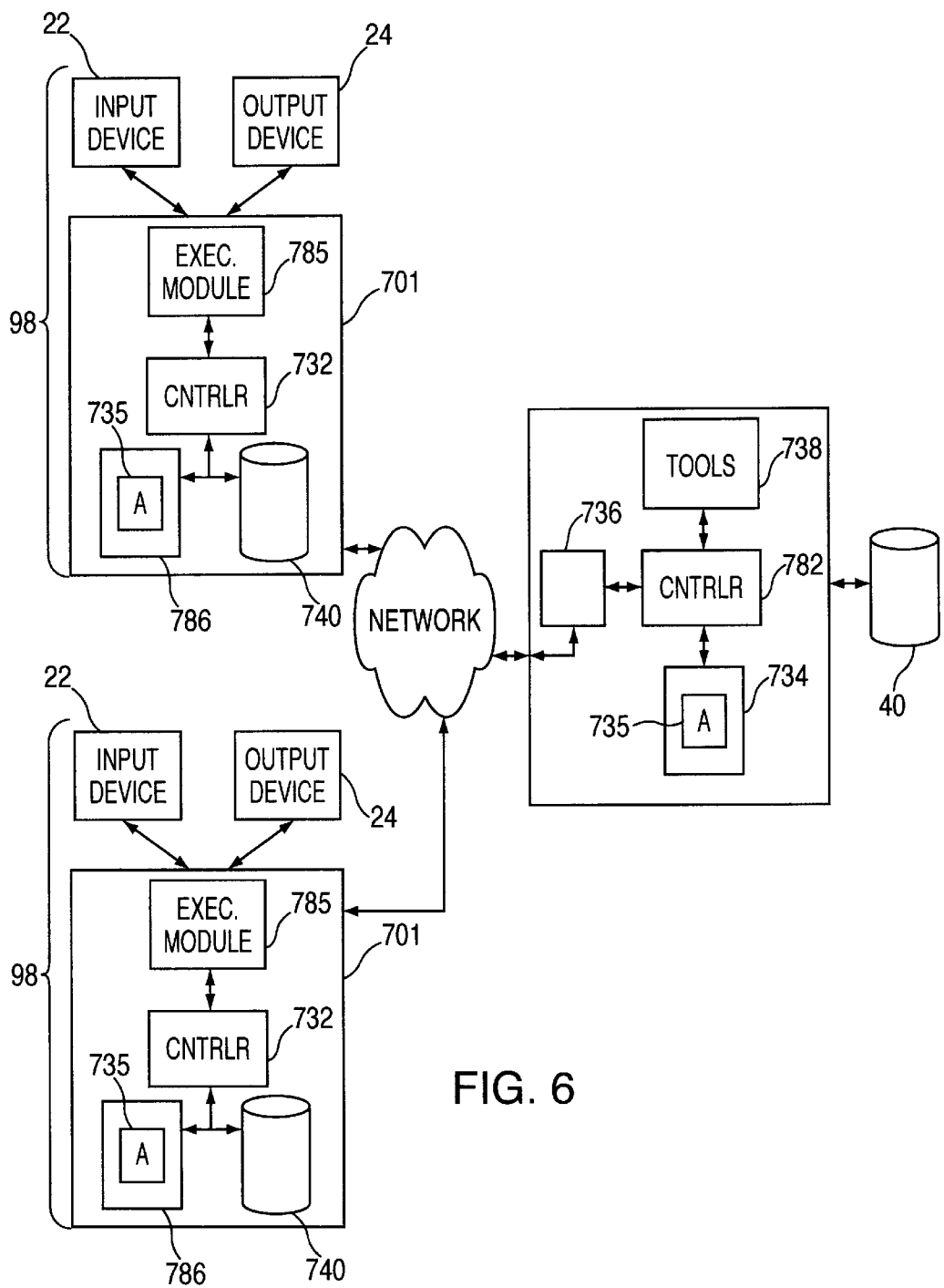
FIG. 6 is a block diagram of a computer system constructed and operating in accordance with an alternative preferred embodiment of the present invention.

A client/server computer/data processing system suitable for use with such embodiments of the invention is shown in FIG. 6. System 700 comprises a plurality of client systems 98 coupled to a server system 30 through a communication network 28 such as, for example, the Internet, an intranet or an extranet. Each of client systems 98 includes an input device 22, an output device 24, and data processor 701. The input device 22 includes, for example, a keyboard, mouse, touch-sensitive screen, electronic stylus or one or more other conventional input devices for inputting information to the client computer system 98. The output device 24 includes, for example, a display device or monitor, a printer or other conventional output devices for receiving and presenting information to users of the client computer system 98.

Client data processor 701 comprises controller 732, volatile memory 786, permanent memory 740, and optional program execution module 785, which can reside in volatile memory 735, permanent memory 740, and/or in any other suitable location. Execution module 785 is a separate executable program optionally used for executing instructions contained in a separate instruction/data structure, such as the "Flash player" program available from Macromedia, which can be used to execute Flash-langauge programs.

Server 30 includes controller 782, permanent and/or volatile memories 734 suitable for storage of application 735, and communications device 736 for communicating, or downloading, application 735 to client systems 98 via network 28 in response to client requests.

Application 735 is a self-contained, executable program, or a data or program structure suitable for being run as a self-contained program, executable in conjunction with other technologies, on client systems 98. For example, application 735 can be a complete, self-contained executable program written in the Java or Javascript language. Alternatively, application 735 can consist of or comprise one or more files or records containing program instructions and data suitable for being run by another executable program already resident on client system 98, as for example a "Flash" data/instruction file suitable for execution by a "Flash player" program.

In either case the application may provide a user interface which, from the viewpoint of the user, is similar or identical to those described above and shown in FIGS. 4A–4F and/or and 5A–5D. Preferably the user interface prompts a user for data input in a manner similar to that previously described, and all data and instructions used in connection with such user input by application 735 in determining and recommending a vehicle size, reside with or within the application on client system 98; and processing is accomplished locally on the client system. For example, application 735 preferably contains and is communicated to client system 98 with information related to default item characteristics such as weight and volume, loading efficiencies, and/or vehicle characteristics hard coded within the application.

For example, referring to FIG. 6, a user wishing to determine an appropriate vehicle size using processes according to the invention uses client system 98 to access server 30 via network 28, as for example through an Internet web site. The user, via client system 98, then accesses an instruction on. server 30 which causes application 735, or a copy thereof, to be communicated from volatile memory 735, data store 40, or other location, to volatile memory 786 on client system 98. The user may then instruct controller 732 to execute application 735, either by running application 735 as a stand alone program or by executing execution module 785 and causing application 735 to be loaded to or executed by module 785.

In general, processing proceeds under the control of controller 732 and application 735, according to the methods and processes described above and as shown in FIG. 3, until a recommended vehicle has been suggested, all required data being hard-coded in application 736 or supplied interactively by the user via input device 722. If and when the user determines to proceed further, as for example to check an availability of or rent a recommended vehicle, processing is optionally shifted to server 30 or other to servers, using programs or systems resident therein or accessible therethrough, under control of server 30 within input from client system 98. Some differences between processing locally or on central server 30 will immediately recommend themselves, as will occur to those of ordinary skill in the art of designing such systems reviewing this disclosure. For example, if required data processing is performed on client systems 98, the need for tracking by server 30 and storage in data store 40 of individual user identification information may be eliminated.

Among other potential advantages of systems and architectures as shown in FIG. 6, are reduced demands on server 30 and data store 40, as application execution and data storage are decentralized, increased speed as network communications requirements are reduced, and increased privacy for users of client systems 98.

While inventive systems and methods have been described and illustrated in connection with preferred embodiments, many variations and modifications, as will be evident to those skilled in this art, may be made without departing from the spirit and scope of the invention. For example, an inventive system or method may use criteria and algorithms described herein, as well as others of which those of skill in the art know, to perform calculations used to determine a load size and/or an appropriate vehicle. Therefore, description herein of specific criteria, or algorithms is not intended to preclude the use of other criteria and algorithms, as will be apparent to those skilled in the relevant arts. Also, a vehicle inventory may include vehicles at one or several locations, and the availability of vehicles included in such inventories depends on many criteria, such as the origination point and destination point of the contemplated transportation, the types of vehicles involved (e.g., trucks, automobiles, aircraft, or boats or ships), the time allowed between the planning stage and execution of the transportation, and user resources. The invention encompasses incorporation of such criteria, which will be apparent to those of ordinary skill in the arts from this disclosure. The invention is thus not to be limited to the precise details of methodology or construction set forth above as such variations and modification are intended to be included within the scope of the invention.

What is claimed is:

1. A computerized method for identifying an appropriate vehicle to transport a load, the method comprising:

receiving information in a computer relating to the load;

identifying with the aid of said computer a vehicle from a set of vehicles based on said received information and size capacity information of vehicles in the set of vehicles, and at least one of the following criteria: information relating to inefficiencies in packing the vehicle, an availability of vehicles within the inventory of vehicles within a user-defined location set, and special packing requirements for items included in the load; and presenting information identifying the vehicle.

2. The method of claim 1, wherein said receiving information relating to the load comprises receiving information relating to items defined by the computer system and items defined by a computer user.

3. The method of claim 2, wherein the step of receiving information relating to items defined by a computer user comprises receiving information relating to at least one of a dimension, a volume and a weight of an item.

4. The method of claim 1, wherein presenting information identifying the vehicle comprises presenting a graphical representation of the vehicle.

5. A computerized method for identifying an appropriate vehicle to transport a load, the method comprising:

receiving information in a computer relating to the load;

identifying with the aid of said computer a vehicle from a set of vehicles based on said received information and size capacity information of vehicles in the set of vehicles, and at least one of the following criteria: information relating to inefficiencies in packing the vehicle, an availability of vehicles within the inventory of vehicles within a user-defined location set, and special packing requirements for items included in the load; and presenting information identifying the vehicle;

wherein the information relating to inefficiencies in packing the vehicle comprises a percentage of vehicle load capacity.

6. The method of claim 5, wherein said percentage is between about fifty and about ninety percent.

7. The method of claim 5, comprising a plurality of percentages, each percentage associated with at least one vehicle included in said vehicle set.

8. A computerized method for identifying an appropriate vehicle to transport a load, the method comprising:

receiving information in a computer relating to the load;

identifying with the aid of said computer a vehicle from a set of vehicles based on said received information and size capacity information of vehicles in the set of vehicles, and at least one of the following criteria: information relating to inefficiencies in packing the vehicle, an availability of vehicles within the inventory of vehicles within a user-defined location set, and special packing requirements for items included in the load; and presenting information identifying the vehicle;

wherein the receiving information comprises providing a user interface which presents graphical representations of items to be included in a load, and receiving input related to the graphical representations.

9. The method of claim 8, wherein receiving input related to graphical representations includes use of a user interface with which graphical representations may be selected using a "point and click" operation.

10. The method of claim 8, wherein receiving input related to graphical representations includes use of a user interface with which graphical representations may be selected using a "drag and drop" operation.

11. A computerized method for identifying an appropriate vehicle to transport a load, the method comprising:

receiving information in a computer system relating to items making up the load;

retrieving size information associated with each of the items;

calculating a load size from the size information of the items;

comparing the calculated load size to load size capacities of vehicles within a set of vehicles;

identifying an appropriate vehicle based on the comparing step; and presenting information identifying the vehicle.

12. The method of claim 11, comprising, prior to the comparing step, presenting interim results including a total size of the items for which information was input.

13. The method of claim 12, comprising storing in a data store available for later use the interim results.

14. In a computer system for identifying an appropriate vehicle to transport a load, the computer system comprising a client system having an input device for inputting information related to items of a projected load and an output device:

a server system coupled to the client system, the server system including a controller and application programming logic executable by the controller for processing said information to determine a size of the projected load, for identifying an appropriate vehicle for transporting the projected load based on the determined load size, capacities of vehicles within a set of vehicles, and at least one other criterion, and for presenting information identifying the vehicle on the output device.

15. The system of claim 14, wherein the at least one other criterion comprises information relating to inefficiencies in packing the vehicle.

16. The system of claim 14, wherein the at least one other criterion includes an availability of vehicles within the inventory of vehicles within a user-defined location set.

17. The system of claim 14, wherein said information related to items of a projected load includes information relating to items defined by the computer system and information relating to items defined by a user.

18. The system of claim 17, wherein said information relating to items defined by a computer user comprises information relating to at least one of a dimension, a volume, and a weight of an item.

19. The system of claim 14, comprising a user interface adapted for presenting graphical representations of items to be included in a load, and for receiving input related to the graphical representations.

20. The system of claim 19, wherein receiving input related to graphical representations includes use of a user interface with which graphical representations may be selected using a "point and click" operation.

21. The system of claim 19, wherein receiving input related to graphical representations includes use of a user interface with which graphical representations may be selected using a "drag and drop" operation.

22. The method of claim 19, wherein presenting information identifying the vehicle comprises presenting a graphical representation of the vehicle.

23. In a computer system for identifying an appropriate vehicle to transport a load, the computer system comprising a client system having an input device for inputting information related to items of a projected load and an output device:

- a server system coupled to the client system, the server system including a controller and application programming logic executable by the controller for processing said information to determine a size of the projected load, for identifying an appropriate vehicle for transporting the projected load based on the determined load size, capacities of vehicles within a set of vehicles, and at least one other criterion, and for presenting information identifying the vehicle on the output device;
- wherein the at least one other criterion comprises information relating to inefficiencies in packing the vehicle, and the information relating to inefficiencies in packing the vehicle comprises a percentage of vehicle load capacity.

24. The system of claim 23, wherein said percentage is between about fifty and about ninety percent.

25. The system of claim 23, comprising a plurality of percentages, each percentage associated with at least one vehicle included in said vehicle set.

26. A computerized method for identifying an appropriate vehicle to transport a load, the method comprising:

presenting on a user interface graphical representations of items to be included in a load;

receiving in a computer system input related to the graphical representations, the input comprising information related to the load;

identifying with the aid of a computer a vehicle from a set of vehicles based on said input and on size capacity information of vehicles in the set of vehicles; and presenting information identifying the vehicle.

27. The method of claim 26, wherein receiving input related to graphical representations includes use of a user interface with which said graphical representations may be selected using a "point and click" operation.

28. The method of claim 26, wherein receiving input related to graphical representations includes use of a user interface with which said graphical representations may be selected using a "drag and drop" operation.

29. A computer system for identifying an appropriate vehicle to transport a load, the computer system comprising:

- a client system having a user interface which presents graphical representations of items to be included in a load, an input device for inputting information related to said graphical representations, and an output device; and
- a server system coupled to the client system, the server system including a controller and application programming logic: executable by the controller for processing said input information to determine a size of a projected load, for identifying an appropriate vehicle for transporting the projected load based on the determined load size and on capacities of vehicles within a set of vehicles, and for presenting information identifying the vehicle on the output device.

30. The system of claim 29, wherein inputting information related to said graphical representations includes use of a user interface with which said graphical representations may be selected using a "point and click" operation.

31. The system of claim 29, wherein inputting information related to said graphical representations includes use of a user interface with which said graphical representations may be selected using a "drag and drop" operation.

\* \* \* \* \*